United States Patent [19]

Allen

[11] Patent Number: 5,149,026
[45] Date of Patent: Sep. 22, 1992

[54] WIRE SUPPORT APPARATUS

[76] Inventor: Roger D. Allen, R.R. 1, Box 749, E. Lebanon, Me. 04027

[21] Appl. No.: 751,137

[22] Filed: Aug. 28, 1991

[51] Int. Cl.[5] .................................................. F16L 3/22
[52] U.S. Cl. ................................. 248/68.1; 248/74.1
[58] Field of Search ..................... 248/68.1, 74.2, 73, 248/74.1, 56, 57; 174/156, 157; 24/115 R, 115 G, 453

[56] References Cited

U.S. PATENT DOCUMENTS

| | | | |
|---|---|---|---|
| 2,868,486 | 1/1959 | Poupitch | 248/68.1 |
| 3,508,730 | 4/1970 | Knezo | 248/74.2 X |
| 4,118,838 | 10/1978 | Schiefer | 174/156 X |
| 4,395,009 | 7/1983 | Bormke | 174/157 X |
| 4,646,995 | 3/1987 | Matsui | 248/56 |
| 4,830,558 | 5/1989 | Sweeney | 248/205.3 X |
| 5,067,676 | 11/1991 | Beele | 248/56 |
| 5,067,677 | 11/1991 | Miceli | 24/453 X |

FOREIGN PATENT DOCUMENTS

| | | | |
|---|---|---|---|
| 2300800 | 1/1973 | Fed. Rep. of Germany | 248/68.1 |
| 1350571 | 4/1974 | United Kingdom | 248/68.1 |
| 2049019 | 12/1980 | United Kingdom | 248/68.1 |

Primary Examiner—J. Franklin Foss
Attorney, Agent, or Firm—Leon Gilden

[57] ABSTRACT

An "L" shaped plate includes a mounting flange, with a first plate of the "L" shaped plate including plural pairs of spaced slots spaced apart a predetermined spacing to define a slot pair, wherein each slot pair is arranged for receiving a locking member, including a "U" shaped configuration with spaced exteriorly ribbed legs receivable within a slot pair to secure a wire member therewithin, wherein the mounting flange is arranged for securement to a construction stud. A modification of the invention includes the first plate with conical sealing plugs arranged for directing through openings within a top plate of a construction to effect sealing relationship between the top plate and a wire member directed therethrough.

3 Claims, 5 Drawing Sheets

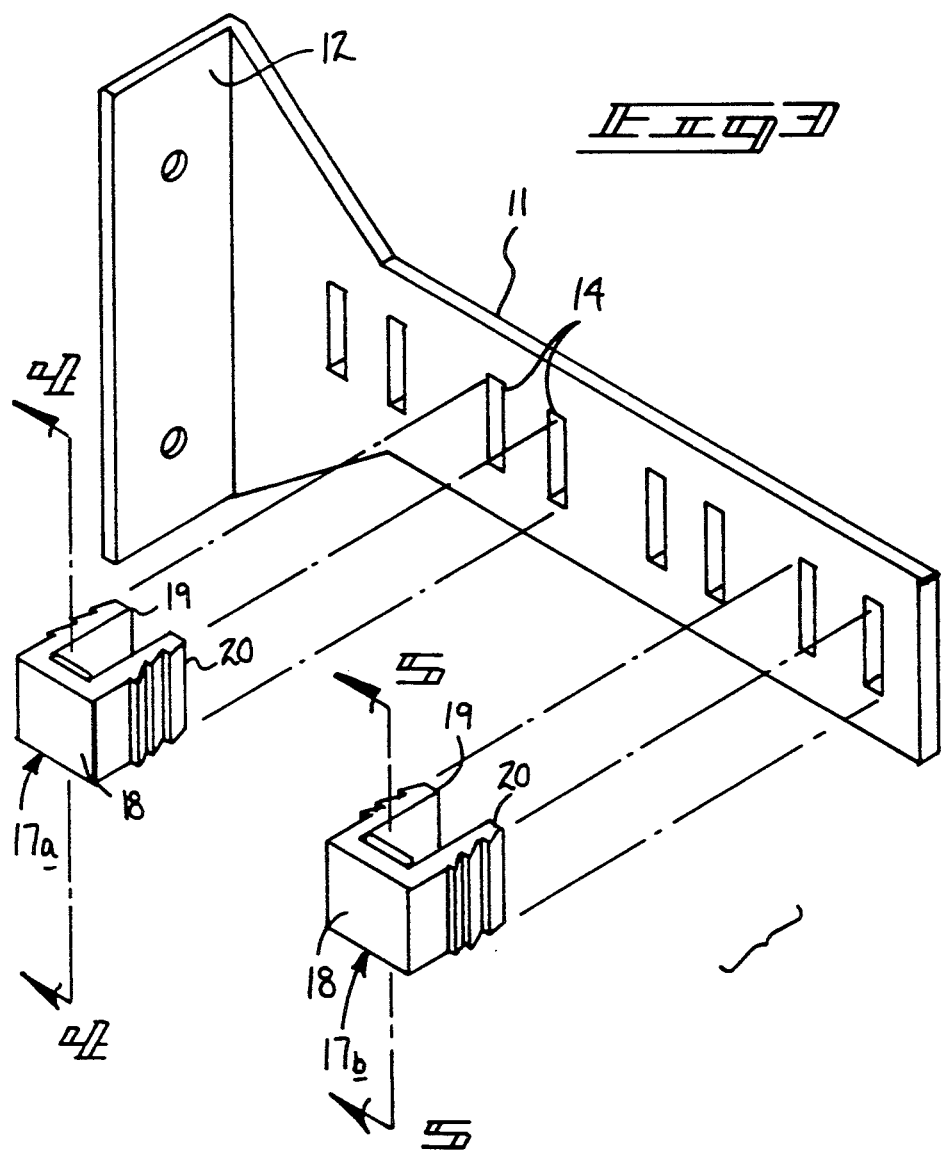
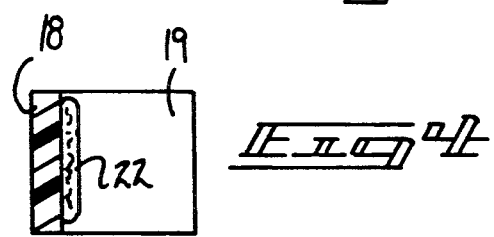
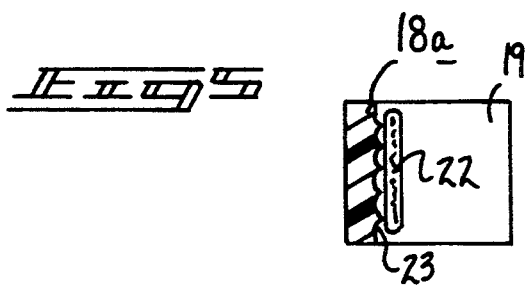

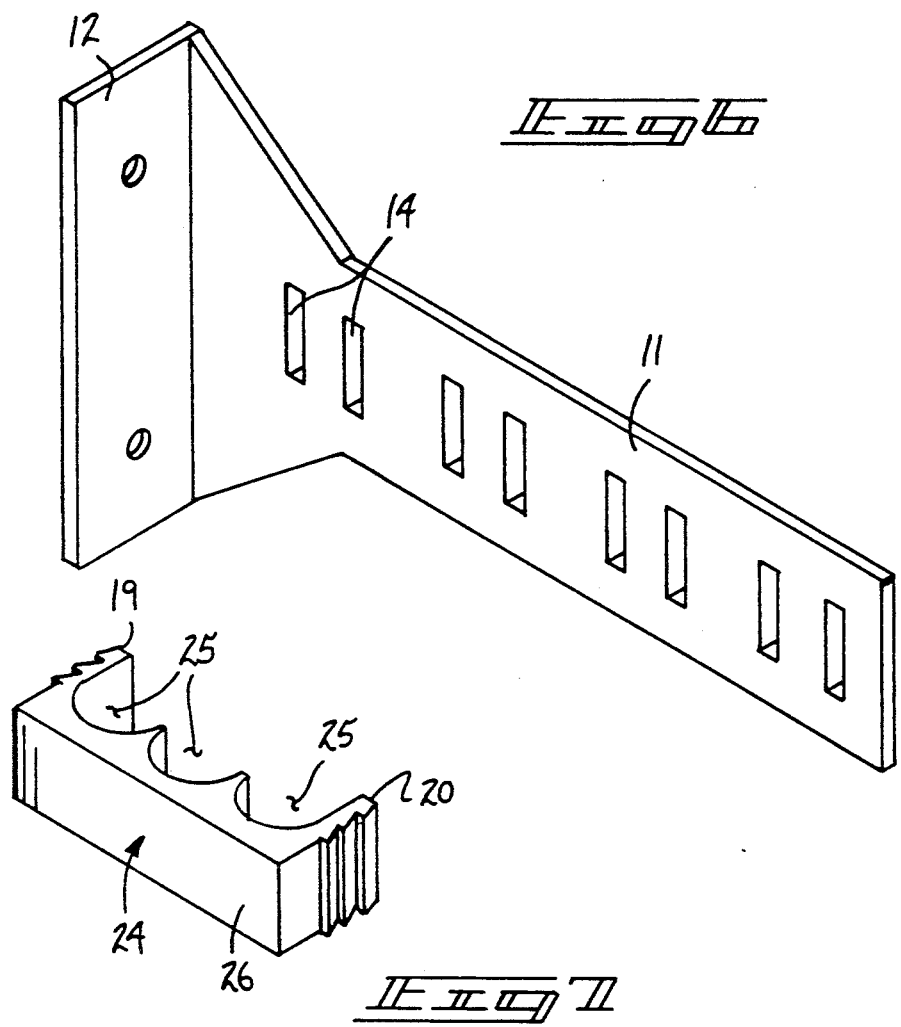
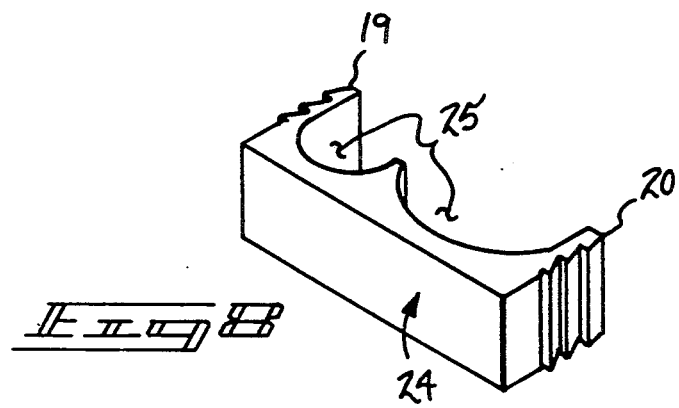

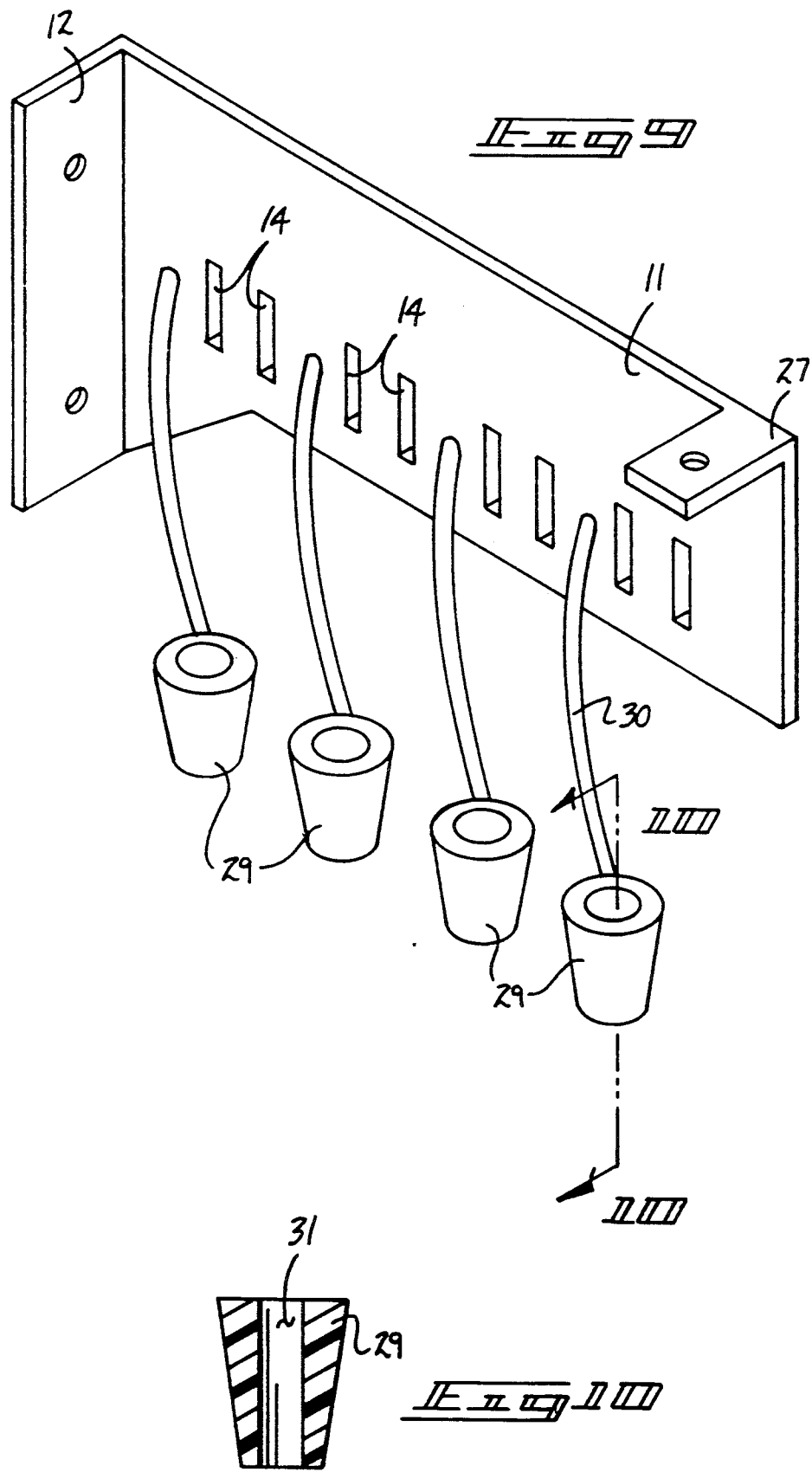

WIRE SUPPORT APPARATUS

BACKGROUND OF THE INVENTION

1. Field of the Invention

The field of invention relates to wire support apparatus, and more particularly pertains to a new and improved wire support apparatus wherein the same is arranged for mounting an individual or plurality of wires directed relative to construction studding.

2. Description of the Prior Art

Mounting of wire members within walls of a construction site is required to accommodate various code requirements and to fixedly position the wires without excessive labor directed thereto. Various prior art conduit mounting brackets are available and are exemplified in U.S. Pat. No. 4,909,461 to Collins wherein a bar member is mounted to span a plurality of construction studs including apertures and recesses to receive conduits therethrough.

U.S. Pat. No. 4,813,639 to Midkiff, et al. sets forth a bracket member for mounting cables thereto, wherein the bracket member includes plates with leg members to project through apertures within the plate.

U.S. Pat. No. 4,709,888 to Cubit, et al. sets forth a hanger for mounting various electrical conduit, wherein the hanger includes support legs for receiving such conduit thereon.

U.S. Pat. No. 4,769,876 to Platt sets forth a wire separator to receive wire members therebetween, wherein the wire separator includes spaced shells securable together.

As such, it may be appreciated that there continues to be a need for a new and improved wire support apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of wire support apparatus now present in the prior art, the present invention provides a wire support apparatus wherein the same utilizes a bracket member mounting spaced slot pairs, wherein each slot pair is arranged for receiving a "U" shaped locking member to secure a wire member to the plate. As such, the general purpose of the present invention, which will be described subsequently in greater detail, is to provide a new and improved wire support apparatus which has all the advantages of the prior art wire support apparatus and none of the disadvantages.

To attain this, the present invention provides an "L" shaped plate including a mounting flange, with a first plate of the "L" shaped plate including plural pairs of spaced slots spaced apart a predetermined spacing to define a slot pair, wherein each slot pair is arranged for receiving a locking member, including a "U" shaped configuration with spaced exteriorly ribbed legs receivable within a slot pair to secure a wire member therewithin, wherein the mounting flange is arranged for securement to a construction stud. A modification of the invention includes the first plate with conical sealing plugs arranged for directing through openings within a top plate of a construction to effect sealing relationship between the top plate and a wire member directed therethrough.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wire support apparatus which has all the advantages of the prior art wire support apparatus and none of the disadvantages.

It is another object of the present invention to provide a new and improved wire support apparatus which may be easily and efficiently manufactured and marketed.

It is a further object of the present invention to provide a new and improved wire support apparatus which is of a durable and reliable construction.

An even further object of the present invention is to provide a new and improved wire support apparatus which is susceptible of a low cost of manufacture with regard to both materials and labor, and which accordingly is then susceptible of low prices of sale to the consuming public, thereby making such wire support apparatus economically available to the buying public.

Still yet another object of the present invention is to provide a new and improved wire support apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the invention utilizing modified locking members.

FIG. 4 is an orthographic view, taken along the lines 4—4 of FIG. 3 in the direction indicated by the arrows.

FIG. 5 is an orthographic view, taken along the lines 5—5 of FIG. 3 in the direction indicated by the arrows.

FIG. 6 is an isometric illustration of the support plate of the invention for receiving a modified locking member.

FIG. 7 is an isometric illustration of the modified locking member for use with the support plate, as illustrated in FIG. 6.

FIG. 8 is an isometric illustration of a further modified locking member, as typified in FIG. 7.

FIG. 9 is an isometric illustration of a modified support plate of the invention.

FIG. 10 is an orthographic view, taken along the lines 10—10 of FIG. 9 in the direction indicated by the arrows.

DESCRIPTION OF THE PREFERRED EMBODIMENT

Figure 1:
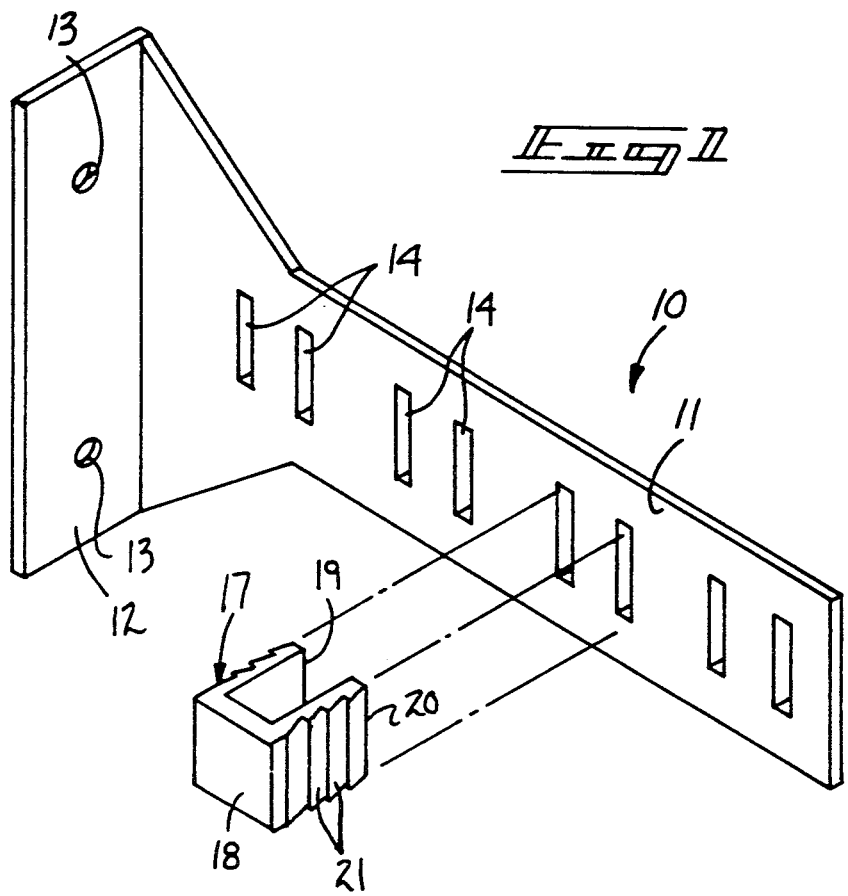
FIG. 1 is an isometric illustration of the instant invention.

With reference now to the drawings, and in particular to FIGS. 1 to 11 thereof, a new and improved wire support apparatus embodying the principles and concepts of the present invention and generally designated by the reference numeral 10 will be described.

Figure 2:
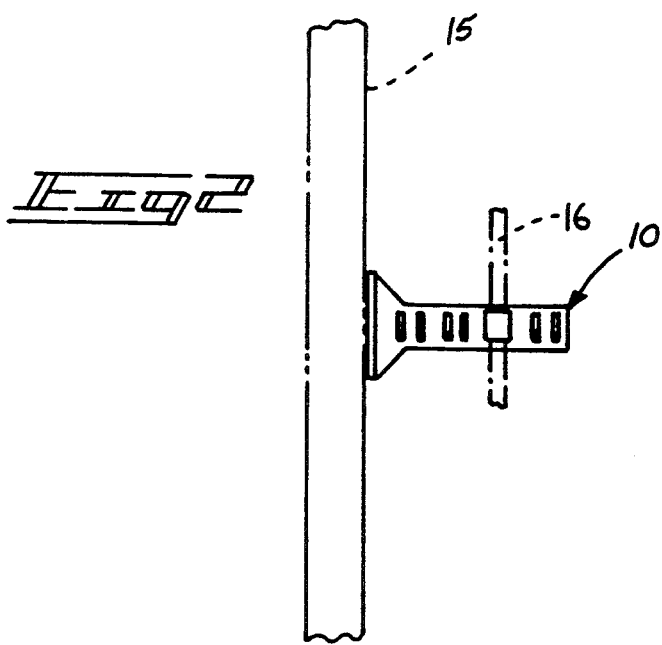
FIG. 2 is an orthographic frontal view, taken in elevation, of the invention.

More specifically, the wire support apparatus 10 of the instant invention essentially comprises an "L" shaped support plate defined by a first plate 11 fixedly and orthogonally mounted to a second plate 12 to define the "L" shaped configuration, wherein the second plate 12 includes a plurality of second plate mounting apertures 13 directed therethrough for securement of the support plate to a construction stud 15, as illustrated in FIG. 2. The first plate 11 includes plural pairs of parallel slots defining slot pairs 14, wherein each slot of each slot pair is spaced apart a predetermined spacing from a counterpart slot of the same slot pair, wherein the predetermined spacing of each slot pair accommodates a first "U" shaped locking member 17 for securement of a wire member 16 relative to the forward surface of the first plate 11. The first "U" shaped locking member 17 includes a first leg 19 spaced from a second leg 20 secured together by a base web 18. The first and second legs 19 and 20 include parallel spaced exterior ribs 21 mounted to each exterior surface of each leg 19 and 20, wherein the ribs are arranged generally parallel to the base web 18.

FIG. 4 illustrates a second locking member 17a that includes a rupturable adhesive packet 22 mounted to an interior surface of the base web 18. The rupturable adhesive packet 22 includes an adhesive contained therewithin, whereupon the associated wire member 16 is fixedly secured relative to the base web 18 to ensure its lack of positioning relative to the locking member 17a. The third locking member 17b is depicted in FIG. 5 utilizing the rupturable adhesive packet 22 mounted to the interior surface of a modified base web 18, wherein the modified base web 18a includes a plurality of piercing teeth 23 in contiguous communication with the rupturable adhesive packet 22. Upon projection of the third locking member 17b into a slot pair 14, the piercing teeth 23 enhance rupturing of the packet to ensure the projection of an adhesive and securement of an associated wire member 16 relative to the third locking member 17b.

FIGS. 6 and 7 illustrate the use of a modified locking member 24, wherein the locking member 24 includes a plurality of "C" shaped cavities 25. The first and second legs 19 and 20 are in a like orientation relative to a rear wall 26 of the modified locking member 24, and the legs 19 and 20 are spaced apart an identical multiple number of the predetermined spacing as the number of "C" shaped cavities to provide for a single locking member to accommodate a plurality of wire members in securement relative to the forward face of the first plate 11. It should also be understood that each "C" shaped cavity 25 may include the adhesive packet 22 and piercing teeth 23, as discussed relative to FIGS. 4 and 5 above.

Figure 11:
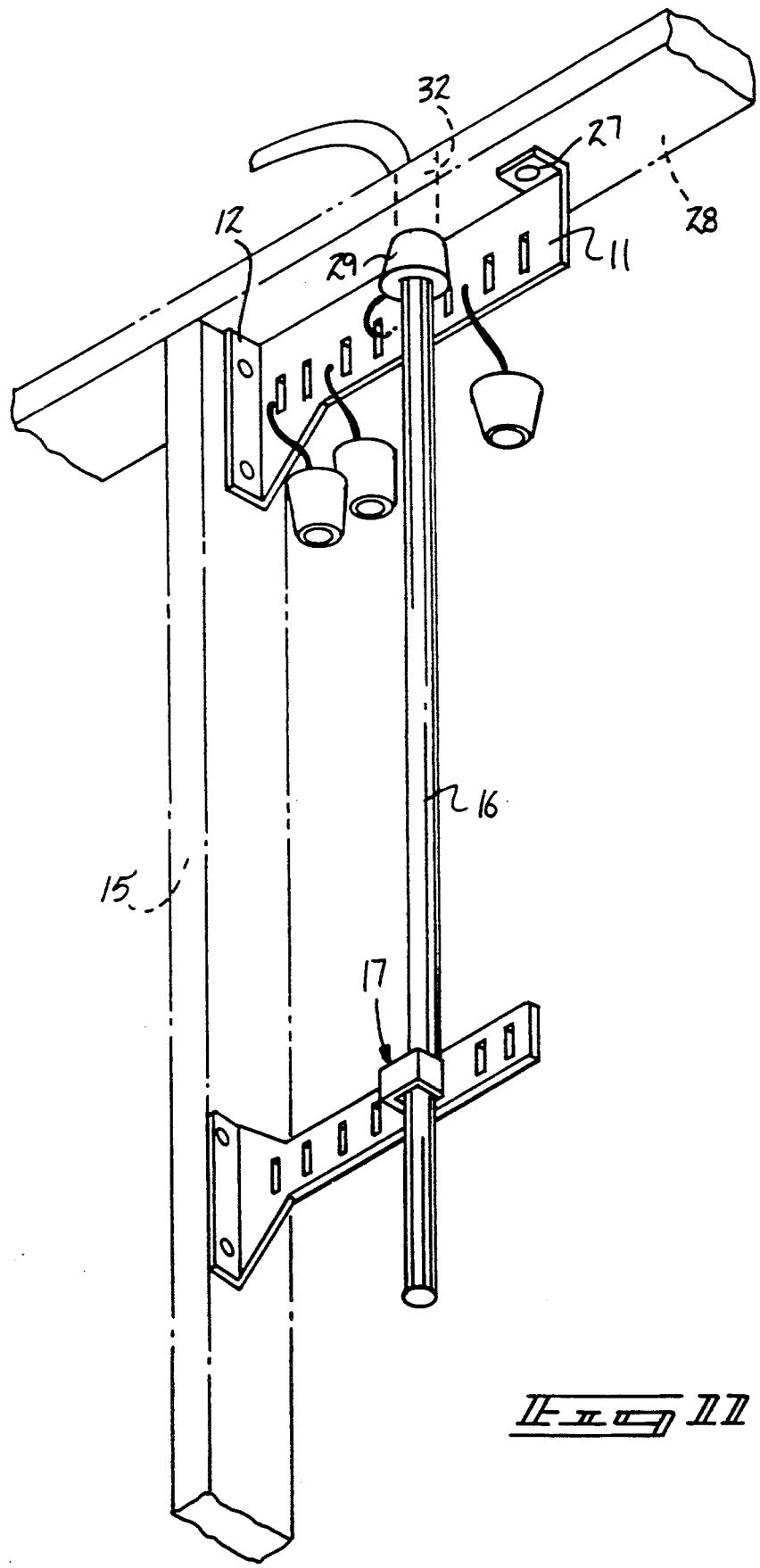
FIG. 11 is an isometric illustration of the invention in use.

FIG. 9 illustrates a modified apparatus wherein the first plate 11 includes a first plate flange 27 with an aperture directed therethrough for securement to a top plate 28. A conical resilient sealing plug 29 includes a tether line 30 to secure the sealing plug relative to the first plate, wherein a sealing plug 29 is associated with each pair of slots 14. Each sealing plug 29 of conical configuration includes an axial bore 31 directed therethrough. In this manner, a construction opening 32 directed through the top plate 28 receives a sealing plug 29 prior to the directing of a wire member 16 therethrough. Typical electrical codes require the sealing relationship of a wire member 16 relative to a horizontal plate member, as illustrated in FIG. 11, and accordingly, the plugs 29 are selectively utilized as required. Further, it should be noted that the first plate 11 utilizes the slot pairs and may further receive a locking member of a type as illustrated in the FIGS. 3-5, 7, and 8.

As to the manner of usage and operation of the instant invention, the same should be apparent from the above disclosure, and accordingly, no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wire support apparatus comprising,
an "L" shaped support plate, the "L" shaped support plate including a first plate orthogonally mounted to a second plate defining an "L" shaped configuration, and
the second plate including mounting means for mounting the second plate relative to a support member, and
the first plate including a plurality of slot pairs directed therethrough, the slot pairs are parallel relative to one another, and each slot pair includes individual slots, wherein each of said individual slots is arranged parallel relative to one another, and each individual slot within a slot pair is spaced apart a predetermined spacing, and
at leat one "U" shaped locking member, the "U" shaped locking mebmer receivable in at least one of said slot pairs for securement of a wire member received within the "U" shaped lock member in confrontation with the first plate when the "U" shaped locking member is directed into the first plate, and
said "U" shaped locking member includes a base web, the base web including a first leg spaced from a second leg, the first leg spaced from the second leg the predetermined spacing, and
the first leg and the second leg each include spaced parallel exterior ribs mounted to each exterior surface of each leg, wherein each of the ribs are arranged parallel relative to the base web, and
the base web includes an interior surface within the "U" shaped locking member, and the interior surface of the base web includes a rupturable adhesive packet mounted thereon, and
the base web includes a series of piercing teeth mounted to the interior surface, and the piercing teeth are in contiguous communication with the rupturable adhesive packet to rupture the adhesive packet upon projection of the "U" shaped locking member within one of said slot pairs.

2. An apparatus as set forth in claim 1 wherein the first plate includes a first plate flange mounted to a top edge of the first plate, the first plate flange includes an aperture directed therethrough to secure the first plate flange to a top plate in a construction environment.

3. An apparatus as set forth in claim 2 wherein the first plate includes a conical resilient sealing plug associated with each of said slot pairs, each conical resilient sealing plug includes a tether line mounting the sealing plug to the first plate, and the sealing plug including an axial bore directed therethrough to receive a wire member therethrough, wtih the sealing plug arranged for projection into an opening within the top plate to effect sealing between the wire member and the top plate.

* * * * *